(12) United States Patent
Birkner et al.

(10) Patent No.: US 10,694,487 B2
(45) Date of Patent: Jun. 23, 2020

(54) DISTRIBUTED NETWORK BLACK BOX USING CROWD-BASED COOPERATION AND ATTESTATION

(71) Applicant: Cisco Technology, Inc., San Jose, CA (US)

(72) Inventors: Matthew H. Birkner, Apex, NC (US); Dmitri Goloubev, Waterloo (BE); Carlos M. Pignataro, Raleigh, NC (US); Gonzalo Salgueiro, Raleigh, NC (US); Joseph M. Clarke, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 71 days.

(21) Appl. No.: 15/265,931

(22) Filed: Sep. 15, 2016

(65) Prior Publication Data

US 2018/0077677 A1    Mar. 15, 2018

(51) Int. Cl.
| | |
|---|---|
| *H04W 64/00* | (2009.01) |
| *H04L 12/26* | (2006.01) |
| *H04L 12/24* | (2006.01) |
| *H04W 24/04* | (2009.01) |
| *H04W 24/08* | (2009.01) |
| *H04L 1/24* | (2006.01) |

(52) U.S. Cl.
CPC ....... *H04W 64/003* (2013.01); *H04L 41/0803* (2013.01); *H04L 43/02* (2013.01); *H04L 43/06* (2013.01); *H04W 24/04* (2013.01); *H04L 1/24* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 6,597,658 B1* | 7/2003 | Simmons | H04L 41/0663 370/221 |
| 7,551,922 B2 | 6/2009 | Roskowski et al. | |
| 7,617,320 B2 | 11/2009 | Alon et al. | |
| 8,712,596 B2 | 4/2014 | Scott | |
| 9,172,580 B1* | 10/2015 | Paczkowski | H04W 12/04 |
| 9,385,917 B1 | 7/2016 | Khanna et al. | |
| 2003/0040955 A1* | 2/2003 | Anaya | G06Q 10/0637 705/7.36 |
| 2003/0140056 A1* | 7/2003 | Wall | G06F 16/9537 |
| 2003/0202465 A1* | 10/2003 | Cain | H04L 45/04 370/225 |

(Continued)

*Primary Examiner* — Christopher T Wyllie
(74) *Attorney, Agent, or Firm* — Edell, Shapiro, & Finnan, LLC (57) ABSTRACT

Presented herein are techniques for obtaining pertinent information from a network upon detection of an anomaly by receiving, at a first network node, configuration information sufficient to establish a data collection policy for the network node, capturing data, on the first network node, in accordance with the data collection policy to obtain captured data, detecting an anomaly occurring with respect to a second network node, and in response to detecting the anomaly, in transferring from the first network node, to an analysis server, collected data derived from the captured data based on both the data collection policy and a proximity metric indicating a logical distance between the first network node and the second network node.

17 Claims, 6 Drawing Sheets

(56) References Cited

U.S. PATENT DOCUMENTS

| | | | |
|---|---|---|---|
| 2004/0039968 A1* | 2/2004 | Hatonen | G06K 9/6284 714/39 |
| 2008/0222320 A1* | 9/2008 | Suganuma | G06F 13/4269 710/35 |
| 2009/0201804 A1* | 8/2009 | Johri | H04L 43/0817 370/225 |
| 2009/0289787 A1* | 11/2009 | Dawson | G08B 27/003 340/540 |
| 2010/0169108 A1* | 7/2010 | Karkanias | G06Q 50/22 705/2 |
| 2010/0257403 A1* | 10/2010 | Virk | G06F 11/1453 714/15 |
| 2013/0016625 A1* | 1/2013 | Murias | H04W 8/005 370/254 |
| 2013/0181953 A1* | 7/2013 | Hinckley | G06F 3/0383 345/179 |
| 2013/0287034 A1* | 10/2013 | Sharma | H04L 12/4641 370/395.53 |
| 2014/0317246 A1* | 10/2014 | Yurchenko | H04L 45/124 709/220 |
| 2015/0046512 A1* | 2/2015 | Ashby | H04L 43/08 709/203 |
| 2015/0185824 A1* | 7/2015 | Mori | G06F 3/01 345/156 |
| 2015/0241961 A1* | 8/2015 | Morris | G06F 3/012 345/156 |
| 2016/0088502 A1* | 3/2016 | Sanneck | H04W 24/08 370/242 |
| 2016/0173211 A1* | 6/2016 | Ouyang | H04B 17/318 455/425 |
| 2016/0248624 A1* | 8/2016 | Tapia | H04L 41/5009 |
| 2016/0328641 A1* | 11/2016 | AlSaud | G06Q 10/04 |
| 2017/0004529 A1* | 1/2017 | Reimer | G06Q 30/06 |
| 2017/0041815 A1* | 2/2017 | Fernandez Arboleda | H04L 41/064 |
| 2017/0070641 A1* | 3/2017 | Matsutani | H04N 1/32683 |
| 2017/0200088 A1* | 7/2017 | Yang | G06F 11/3409 |
| 2017/0330100 A1* | 11/2017 | Bevan | G06F 16/00 |

* cited by examiner

FIG.6

DISTRIBUTED NETWORK BLACK BOX USING CROWD-BASED COOPERATION AND ATTESTATION

TECHNICAL FIELD

The present disclosure relates to managing an electronic communications network.

BACKGROUND

Managing networks can largely be a matter of risk management and decision support. Network administrators want to minimize the risk of events such as equipment failure while, at the same time, maximize performance such as maintaining high bandwidth. These types of management tasks bring with them a number of types of data management problems. For example, for failures in the network, the types of questions that an administrator needs to ask depend upon the current context: such as how, where and when did the event occur. Oftentimes, when a given network device experiences a failure, the network device itself may not be able to notify an administrator or what went wrong, leaving the administrator with insufficient information to diagnose and correct the failure.

DESCRIPTION OF EXAMPLE EMBODIMENTS

Overview

Presented herein are techniques for obtaining pertinent information from a network upon detection of an anomaly by receiving, at a first network node, configuration information sufficient to establish a data collection policy for the network node, capturing data, on the first network node, in accordance with the data collection policy to obtain captured data, detecting an anomaly occurring with respect to a second network node, and in response to detecting the anomaly, transferring from the first network node, to an analysis server, collected data derived from the captured data based on both the data collection policy and a proximity metric indicating a logical distance between the first network node and the second network node.

A device or apparatus in the form of, e.g., a network router or switch, is also presented herein and is configured to perform the operations of the described methodology. This methodology is useful to capture the state of one or more network devices when an anomaly has occurred in the network.

Example Embodiments

Recreating the state of multiple network elements after an incident has occurred (such as a router link flap, Border Gateway Protocol (BGP) change, failure, etc.) is nearly impossible due to the vast amount of data from all nodes that one would have to be captured continuously (e.g., existing memory/buffer state, link state databases, routing tables, etc.).

Even if it were possible, this would require extensive passive or active monitoring, large storage arrays, extra bandwidth, among other resources, resulting in a very expensive and complex solution which might actually lead to an overwhelming amount of forensic analysis.

In reality, many network outages are characterized by a "chain reaction" of multiple seemingly disconnected conditions that exist throughout the network just prior to the outage(s). For example, as a new route is added, devices directly adjacent to a "problem node" might experience a link flap along with low memory thus triggering a series of crashes, which might all be related to the same initial problem rather than –n-number of seemingly different issues.

To monitor a network for purposes of, e.g., ensuring uptime and quality of service, described herein is a methodology configured to intelligently retrieve a snapshot of key parameters ("key performance indicators" or KPIs) saved prior to a network event, so a root cause of a failure can more easily be identified through efficient forensic analysis. It is not uncommon, with today's complex network topologies, for forensic analysis to take many hours, days or even weeks. Embodiments described herein attempt to optimize the data that is analyzed thereby speeding up the overall forensic analysis.

The embodiments described herein implement a system in which state information or KPI collection is distributed across the entire network itself and is tailored based upon various relationships between devices.

Further, it is noted that a great deal of forensic analysis revolves around device crashes. That is, when a device crashes, a "crashinfo" file might be produced and analyzed. However, there is a very likely possibility that a given device does not crash (and thus such a "crashinfo" file is never created), or it is likewise possible that the device simply disappears from the network altogether (and such a "crashfile" is never created or sent). Thus, embodiments described herein also provide approaches to holistic network data collection and storage to address such issues.

Network Black Box

The embodiments described herein are directed to a methodology and corresponding equipment to implement a "Network Black Box" that is configured to dynamically capture the state of all relevant network elements as they existed prior to an outage, including the impacted node. This is achieved by using a topology aware, pre-configured policy that examines the type of event that has occurred as well as the proximity of the problem node to intelligently create a network-level composite event timeline of vital forensic data to more quickly reach a resolution. Additionally, coordinated check-pointing of each node's captured data to recipient node(s) is implemented to address cases where complete data loss on impacted node(s) occurs. With a system so implemented, administrators or operators can have a substantially complete view of the state of network elements impacted and those surrounding a network outage without having to capture all state information of all devices all of the time.

Figure 1:
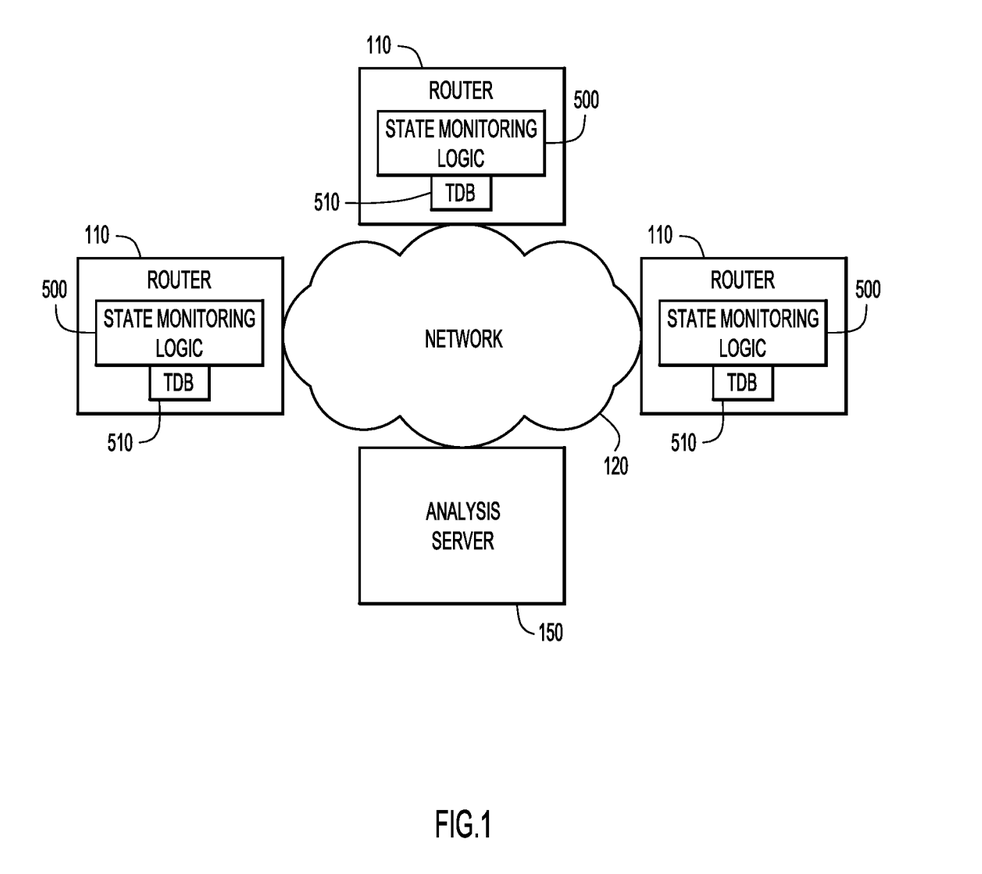
FIG. 1 depicts an electronic communications network in which state monitoring logic can be deployed in accordance with an example embodiment.

FIG. 1 depicts an electronic communications network 100 in which state monitoring logic 500 (i.e., instances of software and hardware that comprise the Network Black Box) can be deployed in accordance with an example embodiment. Specifically, network nodes, such as routers 110, are interconnected with one another via network 120. Those skilled in the art will appreciate that the network nodes could be other types of nodes such as switches or firewalls, for example, and the instant embodiments should not be construed as being limited to any particular type of network node. The instant embodiments should be considered applicable to any given equipment vendor or version of code.

Network 120 may be the Internet or any other public or private network enabling individual network nodes to communicate with one another.

Figure 2:
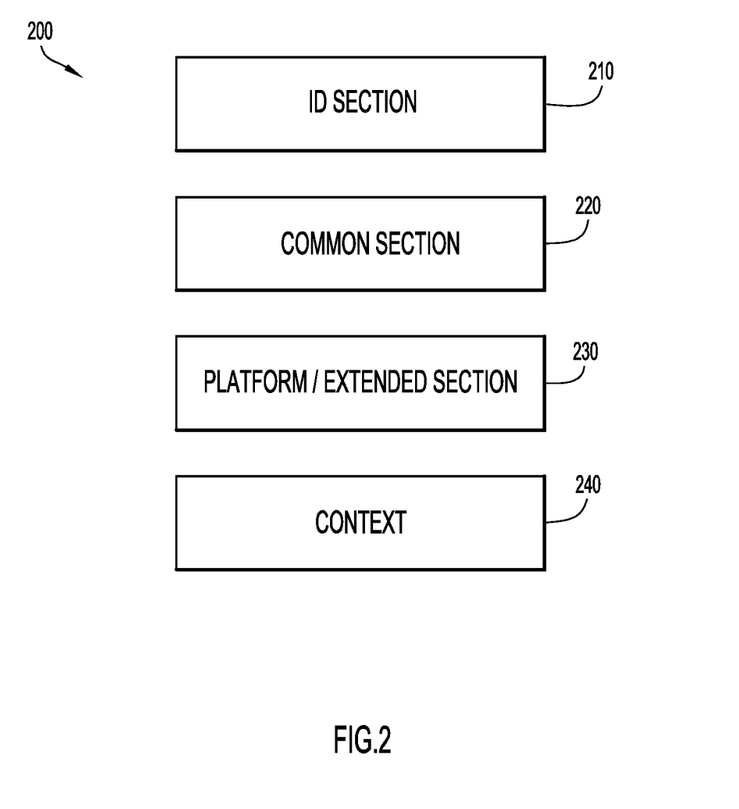
FIG. 2 depicts an example data structure with which to capture state information in accordance with an example embodiment.

Each instance of state monitoring logic 500 also includes a telemetry database (TDB) 510 that is used to store captured state information (KPIs) in a rolling manner, e.g., updated every 30 seconds, 1 minute, 5 minutes, 10 minutes, etc., or as configured depending on the circumstances of the particular network being monitored. FIG. 2 depicts an example data structure 200 with which to capture state information in accordance with an example embodiment. That is, data structure 200 can be implemented on each TDB 510 instantiated on each network node. Data structure 200 may include, for example, an ID or fixed section 210, a common section 220, a platform/ended section 230 and a context section 240. Examples of the particular types of data that are contemplated to be included in the respective sections of data structure 200 are provided in the table below.

| Section | Data |
| --- | --- |
| Fixed | Device hostname/Physical ID/Function<br>Time/Uptime |
| Common | Control plane adjacencies count/layer<br>Forwarding interfaces count<br>Packet count in/out<br>Control plane packets<br>Packet drops summary<br>SW/HW Config change indicators<br>Control plane change indicator<br>Data plane change indicator<br>Log tail sample: total, severe, unusual, top mnemonic |
| Infrastructure | CPU 5 sec, 1 min, 5 min, top 3<br>Free Memory, 1 w, 1 d, 1 h, top 3<br>IPC<br>Interrupts<br>File systems (mounted, writeable, free space)<br>Diagnostics tests: ran, passed, failed |
| Context | Control plane: lastX entities/interfaces with changes, SPF-triggering LSA sample<br>Interfaces: lastX interfaces to change forwarding state<br>Packet drops: topX drop sources, topX drop packet types, topX drop reasons<br>SW/HW config change: config diff/hash<br>Data plane change: entity/instance sample<br>Log: tail X messages sample |

| Section | Data |
| --- | --- |
| | CPU: topX process, call stacks<br>Memory: topX user, topX allocators, allocation_id<br>IPC: MTS sample for opcode/sap/queue |

As will be explained more fully below, and again with reference to FIG. 1, upon detection of a selected network event, e.g., a link failure, each instance of state monitoring logic 500 will determine its proximity to the problem node and, based on the type of problem and proximity to the problem node, collect selected captured state information, from its rolling buffer or memory for storage to non-volatile memory, and/or forward the collected state information directly to analysis server 150. Analysis server 150 receives the collected state information (KPIs) from a plurality of instances of state monitoring logic 500 running on respective network nodes and can then conduct forensic analysis to correlate multiple KPIs and shed light on the network failure.

Three modes are contemplated to implement the Network Black Box: CONFIGURATION, DETECTION, and SMART COLLECTION AND TRANSFER. Each is discussed in turn below.

In CONFIGURATION MODE, a collection policy is pushed to or pre-programmed on each network node 110 (i.e., into state monitoring logic 500) that defines what data (KPIs) to capture based on certain types of events, and based on a Proximity Metric. As an example, configuration fields may include NAME, TRIGGER_TYPE, DATA_COLLECTION_POLICY, PROXIMITY_METRIC, SERVER_DESTINATION and FORMAT of collected data. Multiple collection policies may be pushed to each node.

In DETECTION MODE, following an event that is detected based on its pre-configured collection policy, such as a link failure, or BGP AS path change, a "nearness algorithm" is performed on each node to determine the "Proximity Metric" (i.e., is the problem location a direct connected node, a multi hop node, a leaf node, within an IGP area location, or within a given BGP AS path length, etc.). The end goal is determine how far away each network node 110 is from the actual problem network node to thereby determine which state information (KPIs) to capture from a given node's telemetry database 510 and forward to analysis server 150.

One example of a topology "nearness algorithm" is to compare the current IGP database to the pre-failure IGP database (i.e., compare the routing topology before and after the failure and identify changes (e.g., new nodes, links removed, etc.). This can be in the form of the pre- and post-failure OSPF or IS-IS link-state databases or from offline routing topology snapshots. The Proximity Metric, could thus be a quantitative value (i.e., hop driven or any other attribute area, leaf nodes, BGP AS path length or combination thereof) that indicates how far away each node is from the actual problem node.

In SMART COLLECTION AND TRANSFER MODE, based on each node's self computed Proximity Metric, and matching up the configuration policy associated with that Proximity Metric and trigger type, device specific data spooling and/or streaming occurs on just the nodes and just the data that meet the collection policy and detection criteria configured. More specifically, the instant embodiments provide "rolling in-memory key performance indicator (KPI) snapshots," which are bits of information corresponding to the pre-configured collection policies and might include items such as igp state, config state, memory, cpu, sysdb, i2rs db, lsdb, etc. In one possible implementation, in TRANSFER MODE, these KPI values are collected, i.e., written to the local device flash or reliably streamed to the target only after a detection occurs. The amount of data stored in the rolling memory buffer is configurable to create a historical view and thus can be used to recreate the state of the device just before the actual event happens.

The selected or collected data is sent to analysis server 150 for correlation (or stored locally). Analysis server 150 will then correlate the received state information (collected data) based on received data that includes the same, e.g., incident id and time stamps.

Configuration of Collection Policies

As discussed above, in the CONFIGURATION MODE, a "Collection Policy" is programmed to each participant node or device based on NAME, TRIGGER_TYPE, DATA_COLLECTION_POLICY, PROXIMITY_METRIC, SERVER_DESTINATION and FORMAT (i.e., JSON, CSV, local bootflash, tcp or udp socket, etc.).

Figure 3:
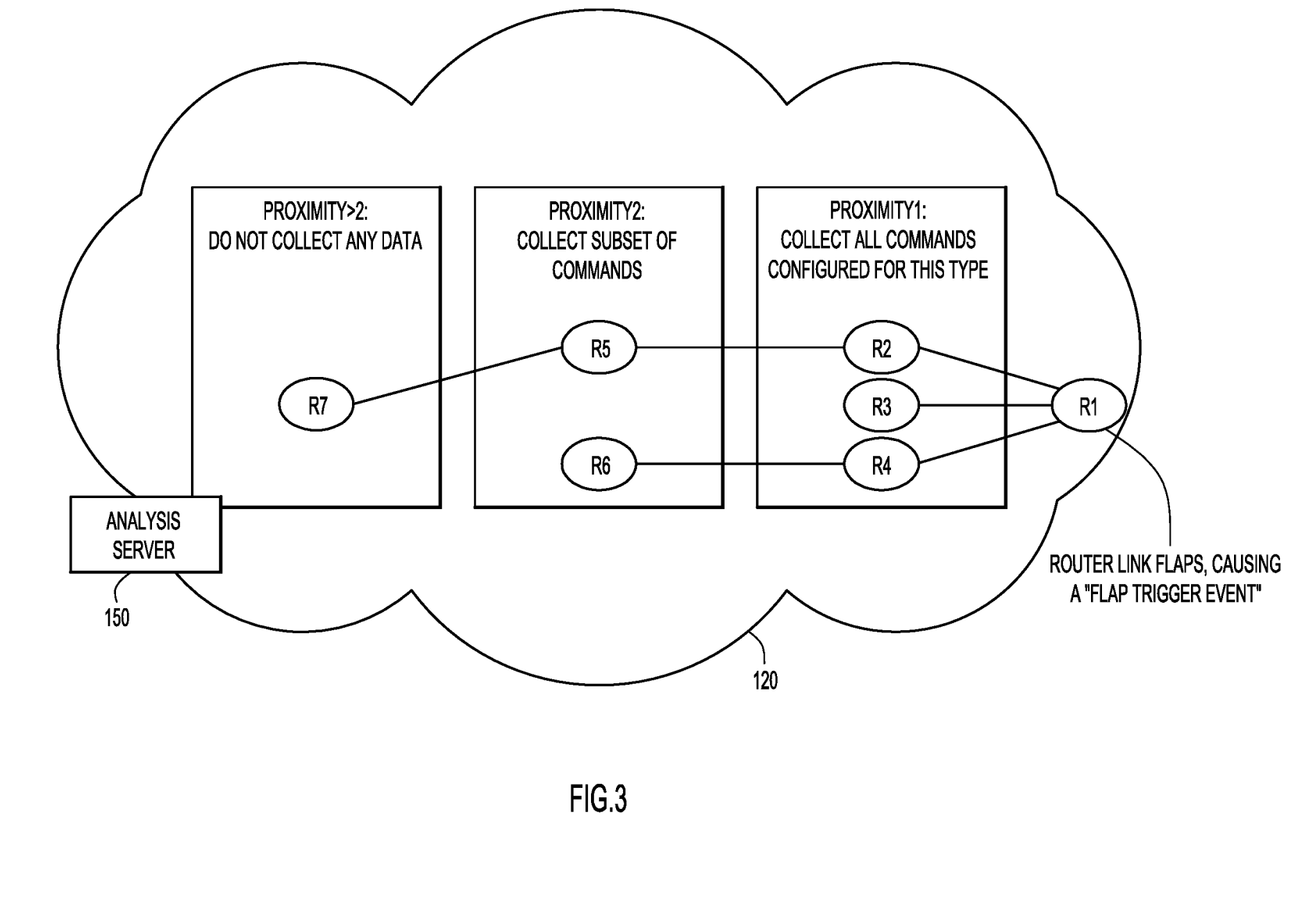
FIG. 3 illustrates the use of a proximity metric to determine the type or amount of state information to be sent from a given network device to a collection or analysis server in accordance with an example embodiment.

FIG. 3 illustrates the use of a proximity metric to determine the type or amount of state information to be collected and sent from a given network node to a collection or analysis server in accordance with an example embodiment.

So, for example, a collection policy could be programmed to capture any variety of link state databases, sysdb, i2rs db, or full list of commands or APIs and collect the same if it self-determines to be 1 hop away from the triggered node (e.g., R1), which exhibits router link flaps. That is, nodes R2, R3, R4 (within proximity 1) might store all KPIs indicated for link flap events.

The same policy, but viewed at a different node set (i.e., R5, R6) may just collect the IGP database, for example, since it self-determines it is located within 2 hops of the impacted node R1 (within proximity 2). R7, which is in proximity >(greater than) 2 does not collect any data since R7 is too far ways from the impacted node and thus would likely provide very little additional helpful information. Thus, there will be a network wide set of "verbose" data collected for "direct neighbors" that witnessed a flap, and a "smaller, less-verbose" set of data collected for other elements, depending on their policy and proximity to the failure, as defined in their collection policy.

All of the collected data (i.e., data selected from TDB 510) is sent independently to analysis server 150 for analysis.

The TRIGGER_TYPE type discussed below is a link flap. Such an event causes an IGP flood to occur that indicates this link is DOWN. In accordance with the instant embodiments, and as described, each node self determines what to gather and sends that data to analysis server 150 or stores the data locally.

An example of a configuration structure follows:
NAME (e.g., GET_BUFF_IGPDB)
TRIGGER_TYPE (e.g., Link_FLAP)
DATA_COLLECTION_POLICY (e.g., sysdb)
PROXIMITY METRIC (e.g., <=2 hop)
SERVER_DESTINATION of Data server (e.g., IP address 1.1.1.1)
FORMAT (e.g., json, tsv, csv, etc.)
Events that embodiments described herein may facilitate identifying include, but are not limited to:

Nodes that completely fail (including hard hardware failure, powered down or physically removed from the network), such that expected information is not available;

Triggering of rarely executable branch of code under uncertain conditions with deviant outcomes; floating hardware failures where deviant effects come and go; and intermittent software failures that occur under complex conditions; and Multiple and cascaded failures.

Detection Mode

The DETECTION MODE starts when an incident (defined as a TRIGGER_TYPE) occurs. As stated, this could be the disappearance of a router or link LSA, BGP neighbor change, AS PATH change, RPF changes, etc. All network nodes configured with an instance of state monitoring logic 500 that witness this event create an incident identifier based on time, type, what device is believed to be the "source" of the problem.

Thus, in the instant example, nodes that are less than or equal to 2 hops away from the node at which a LINK_flap event occurs collects "sysdb" and sends that information to analysis server 150 in accordance with a file format x, where the same file header contains an incidentID based on Time, source node of trigger, and type of trigger. A library of triggers/definitions may be made available to an administrator to facilitate configuration and use of the system.

It is noted that the TRIGGER_TYPE and the DATA_COLLECTION_POLICY do not have to be part of a formal configuration file, but can instead be distributed like antivirus definitions.

As will be appreciated by those skilled in the art, a trigger provides a stimulus to store accumulated telemetry data in non-volatile storage and transfer that data analysis server 150. To effectively collect the correct data across the network, an implementation of the Network Black Box includes propagating a trigger signal to the instances of state monitoring logic 500, merging triggers due to the same underlying cause, and supporting multiple asynchronous events at the same time.

Trigger mechanisms can come in a variety of forms, including:

a library of known triggers that ships alongside a software image (could be a default mechanism);

an onboard anomaly detector that analyses remote and local KPIs; and/or a network-wide anomaly detector implemented using telemetry and located at, e.g., analysis server 150.

Triggers may also be heuristic-based activities including:
Device telemetry missing for 2 consecutive periods
Mayday broadcast received from a node
Significant change in control plane (3x sigma)
Significant change in data packets
Significant jump in errors/drops (3x sigma)
Thresholds such as high CPU over X min, low IPC for X sec, low memory, fast memory growth, etc.

Smart Collection and Transfer Mode

During SMART COLLECTION and TRANSFER MODE, the previously defined rolling buffer of data is spooled to a file or streamed to analysis server 150. The content (i.e., the collected data) includes only the data that the policy matched just prior to the time when the issue occurred.

Connectivity Issues and Component Failures

Analysis server 150 may collect the files through normal polling of respective nodes, or by individual nodes pushing the data to server 150 upon detecting and acting on a triggering event.

That said, parts of a network often become unavailable or unrecoverable during outages due to component failures. In another embodiment, to address a situation where the spool of forensic data cannot be readily offloaded to a central authority, the collected data may be fragmented and distributed through the network via other adjacent nodes.

Figure 4:
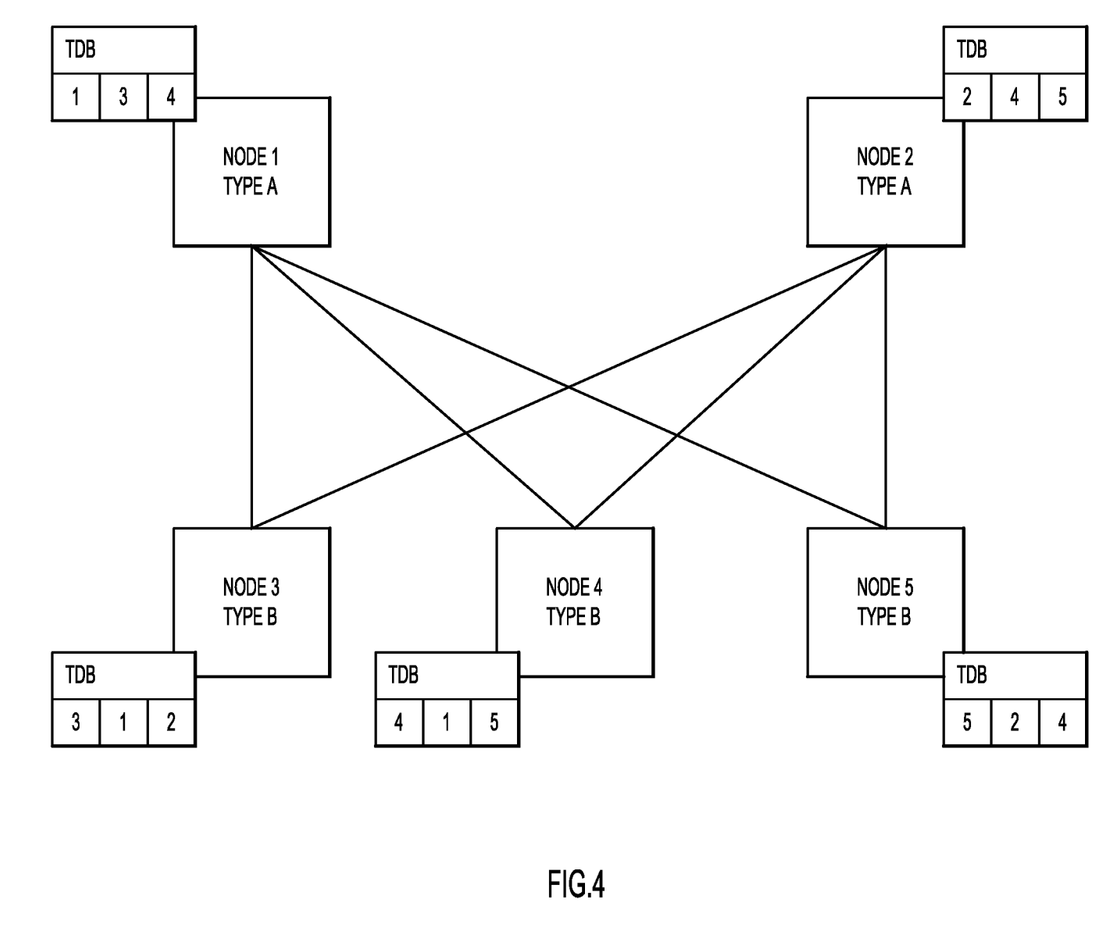
FIG. 4 illustrates a distributed telemetry synchronization technique in accordance with an example embodiment.

More specifically, FIG. 4 illustrates a distributed telemetry synchronization technique in accordance with an example embodiment. In this aspect of an implementation, devices within the system fragment and share their captured or collected data with other devices. When the data owner (that is, the device that holds the master, complete record) is able to synchronize or otherwise expire the data, the distributed fragments are zeroed as well, and new data is distributed.

The distribution of this fragmented data can be accomplished in a number of ways depending on the implementation. For instance, each device could be aware of every supporting node in the network using a methodology that makes every node aware of other nodes in the network. The devices could also periodically advertise the capability through multicast. In this manner, each device knows the others that will support the fragmented archival as well as the amount of storage available. In the case of FIG. 4, each node stores its own telemetry database (indicated by the left most number in the TDB listing corresponding to each node) and at least a portion of another node's database (e.g., Node 1 stores TDB 1, and TDBs from nodes 3 and 4).

Where only portions of a TDB of a given node is stored on different nodes, when it is time to transfer data to analysis server 150, each node chooses from its database of supporting devices which should have each fragment. The number of fragments will vary depending on the overall size of the file and target device storage. Each device sends its fragment. If the device sends a negative acknowledgement (NACK) related to the copy, the sending device can choose another device. If there are not enough devices to support the number of fragments, the file may be re-fragmented with larger (but fewer) fragments until the file has been replicated.

In order to maintain maximum availability of the data, multiple copies of each fragment may be distributed into the network (e.g., creating a "mirrored stripe" of the data). If the data owner disappears from the network, its forensic data file can then be pulled by querying the network for all nodes with a fragment, then reassembling the tagged fragments at the server.

In an effort to maximize availability of captured or collected data that has been distributed to peer devices, logical or virtual devices that share the same physical hardware are preferably not employed to back up each other, e.g., in FIG. 4, Nodes 1 and 2 (both Type A, versus type B, nodes) do not store each others archives. The use of a "mayday" message may also be implemented in the event no peer is available to receive a given node's data, where the given node becomes aware that it is about to go offline.

Thus described hereinabove, is a methodology for each network node to automatically participate in creating a so called "Network Black Box" providing intelligent and autonomous data collection defined by "proximity" to the problem device, in band detection, and a common data gathering policy based on the type of trigger.

One side benefit of the embodiments described herein is that each node can dynamically adjust what it collects when/if a node's placement in the topology or message flow changes.

The overall data collected can be replicated into the network across multiple elements to ensure that if the device disappears, the data record it was building is still retrievable from other nodes.

As those skilled in the art will appreciate, the sooner it is possible to collect and access the most relevant pieces of data the better for problem resolution. The instant embodiments can save a significant amount of time and allow an administrator to spend his/her resources on forensic analysis, not collection tasks.

The following are examples in which the Network Black Box described herein can be particularly helpful.

As a practical example, one hour of hindsight at a 10 sec telemetry sampling period with storing local+two remote samples would amount to approx. 60×6×3=1080 samples/hour at each node. At 1 KB/sample, this would amount to 1 MB/hour on each device. Thus, a 1000 node network would generate about 60 GB of captured data per week.

It is noted that telemetry may be may be compressed by summarization. That is, over time, and by leveraging machine learning, nodes are trained to recognize patterns in telemetry data. Such patterns, especially during normal, static operation can be summarized to reduce the footprint of the stored telemetry data.

Figure 5:
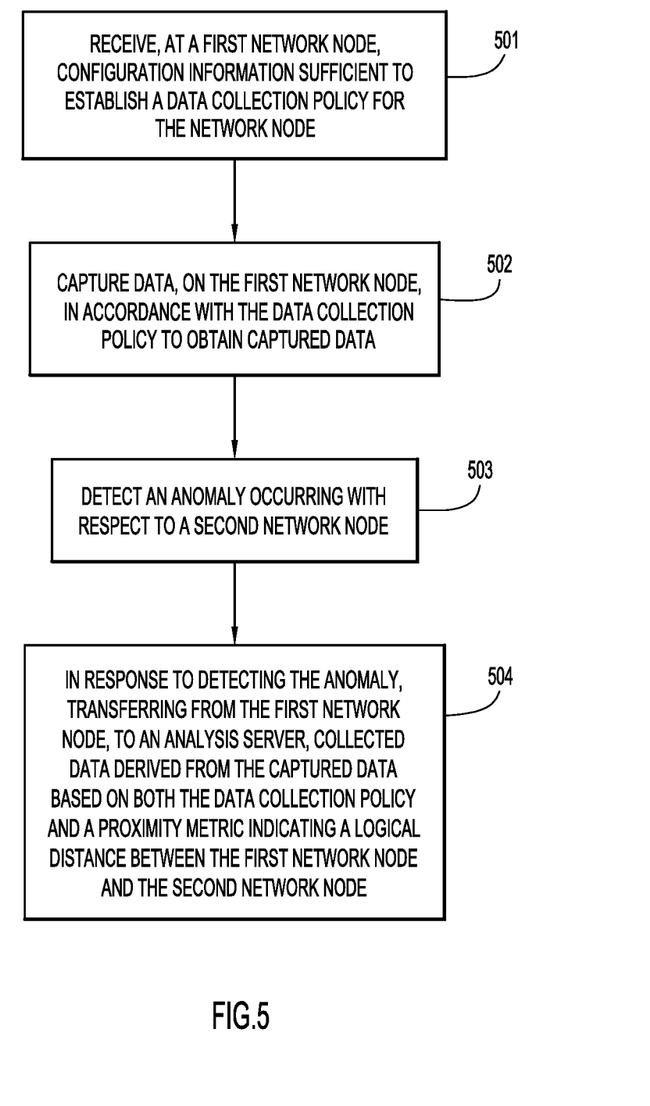
FIG. 5 is a flow chart depicting a series of operations for performing state information collection in accordance with an example embodiment

FIG. 5 is a flow chart depicting a series of operations for performing state information collection in accordance with an example embodiment. At 501, the methodology includes receiving, at a first network node, configuration information sufficient to establish a data collection policy for the network node. At 502, the methodology continues by capturing data, on the first network node, in accordance with the data collection policy to obtain captured data. At 503, an anomaly occurring with respect to a second network node is detected. And, at 504, in response to detecting the anomaly, there is an operation of transferring from the first network node, to an analysis server, collected data derived from the captured data based on both the data collection policy and a proximity metric indicating a logical distance between the first network node and the second network node.

Figure 6:
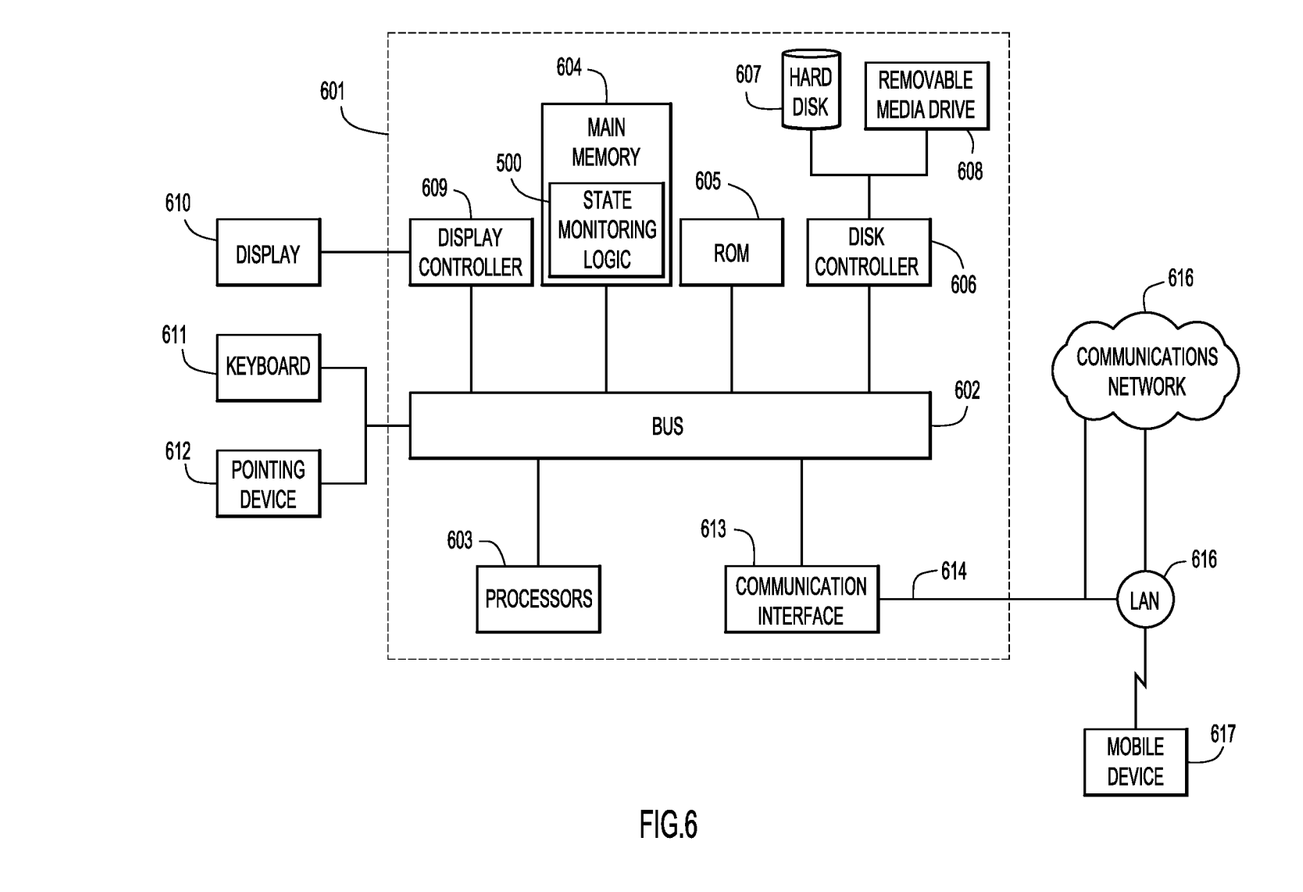
FIG. 6 depicts a device on which the several described embodiments may be implemented.

FIG. 6 depicts an apparatus on which the several described embodiments may be implemented. The apparatus, e.g., a router or analysis server 150, may be implemented on a computer system 601. The computer system 601 may be programmed to implement a computer based device. The computer system 601 includes a bus 602 or other communication mechanism for communicating information, and a processor 603 coupled with the bus 602 for processing the information. While the figure shows a single block 603 for a processor, it should be understood that the processor 603 represents a plurality of processors or processing cores, each of which can perform separate processing. The computer system 601 may also include a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions (e.g., the logic to perform the operation of FIG. 5 and described throughout) to be executed by processor 603. In addition, the main memory 604 may be used for storing temporary variables or other intermediate information during the execution of instructions by the processor 603.

The computer system 601 may further include a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 may also include a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 601 may also include a display controller 609 coupled to the bus 602 to control a display 610, such as a cathode ray tube (CRT) or liquid crystal display (LCD), for displaying information to a computer user. The computer system 601 may include input devices, such as a keyboard 611 and a pointing device 612, for interacting with a computer user and providing information to the processor 603. The pointing device 612, for example, may be a mouse, a trackball, or a pointing stick for communicating direction information and command selections to the processor 603 and for controlling cursor movement on the display 610. In addition, a printer may provide printed listings of data stored and/or generated by the computer system 601.

The computer system 601 performs a portion or all of the processing operations of the embodiments described herein in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 601, for driving a device or devices for implementing the described embodiments, and for enabling the computer system 601 to interact with a human user. Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616. For example, the communication interface 613 may be a wired or wireless network interface card or modem (e.g., with SIM card) configured to attach to any packet switched (wired or wireless) LAN or WWAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local are network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613. Moreover, the network link 614 may provide a connection to a mobile device 617 such as a personal digital assistant (PDA) laptop computer, cellular telephone, or modem and SIM card integrated with a given device.

Thus, in accordance with an embodiment, a method is provided and comprising operations of receiving, at a first network node, configuration information sufficient to establish a data collection policy for the first network node, capturing data, on the first network node, in accordance with the data collection policy to obtain captured data, detecting an anomaly occurring with respect to a second network node, and in response to detecting the anomaly, transferring from the first network node, to an analysis server, collected data derived from the captured data based on both the data collection policy and a proximity metric indicating a logical distance between the first network node and the second network node.

A device is also provided and includes an interface unit configured to enable network communications, a memory, one or more processors coupled to the interface unit and the memory, and configured to: receive configuration information sufficient to establish a data collection policy, capture data in accordance with the data collection policy to obtain captured data, detect an anomaly occurring with respect to a network node of a network in which the device is also located, and in response to detecting the anomaly, transfer, to an analysis server collected data derived from the captured data based on both the data collection policy and a proximity metric indicating a logical distance between the device and the network node.

Further, provided are one or more non-transitory computer readable storage media encoded with software comprising computer executable instructions and when the software is executed operable to: receive configuration information sufficient to establish a data collection policy, capture data in accordance with the data collection policy to obtain captured data, detect an anomaly occurring with respect to a network node of a network in which a device on which the software is executing is also located, and in response to detecting the anomaly, transfer, to an analysis server collected data derived from the captured data based on both the data collection policy and a proximity metric indicating a logical distance between the device and the network node The above description is intended by way of example only. Various modifications and structural changes may be made therein without departing from the scope of the concepts described herein and within the scope and range of equivalents of the claims.

What is claimed is:

1. A method comprising:
   receiving, at a first network node and at a second network node, configuration information sufficient to establish a data collection policy for the first network node and the second network node;
   capturing data, on the first network node, in accordance with the data collection policy to obtain first captured data;
   capturing data, on a second network node, in accordance with the data collection policy to obtain second captured data;
   detecting an anomaly occurring at a third network node; and
   in response to detecting the anomaly, transferring from the first network node, to an analysis server, first collected data derived from the first captured data based on both the data collection policy and a first proximity metric indicating a logical distance between the first network node and the third network node, and transferring from the second network node, to the analysis server, second collected data derived from the second captured data based on both the data collection policy and a second proximity metric indicating a logical distance between the second network node and the third network node, wherein the first collected data and the second collected data are different from each other, and are based on an anomaly trigger type, and on the first proximity metric and the second proximity metric, respectively,
   the method further comprising:
   transferring from the first network node, to the analysis server, a first amount of first collected data when the first network node and the third network node are separated by a first logical distance, and transferring from the first network node, to the analysis server, a second amount of first collected data that is less than the first amount of collected data when the first network node and the third network node are separated by a second logical distance that is greater than the first logical distance.

2. The method of claim 1, wherein the configuration information includes instructions regarding types of data to collect.

3. The method of claim 1, wherein the configuration information includes at least one of the anomaly trigger type, a proximity event to source indicator, a destination address of the analysis server, or a format of the collected data.

4. The method of claim 1, wherein detecting the anomaly comprises detecting at least one of: whether the captured data is missing at least two consecutive periods, whether a mayday broadcast is received from the third network node, a predetermined change in a control plane of a network in which the first network node and the third network node are located is detected, a predetermined change in data packets reaching the first network node or the third network node is detected, or a predetermined threshold has been met.

5. The method of claim 1, further comprising storing the first collected data in non-volatile memory in the first network node.

6. The method of claim 1, further comprising loading the first network node with a library of trigger definitions corresponding to potential anomalies.

7. The method of claim 1, further comprising storing the first captured data in a distributed manner across a plurality of network nodes other than the analysis server, the first network node and the second network node.

8. The method of claim 1, further comprising performing forensic analysis on the collected data.

9. A device comprising:
   an interface unit configured to enable network communications;
   a memory; and
   one or more processors coupled to the interface unit and the memory, and configured to:
   receive configuration information sufficient to establish a data collection policy;
   capture data in accordance with the data collection policy to obtain captured data;
   detect an anomaly occurring at a network node of a network in which the device is also located; and
   in response to detecting the anomaly, transfer, to an analysis server one of first collected data and second collected data derived from the captured data, wherein the first collected data is based on both the data collection policy and a first proximity metric indicating a first logical distance between the device and the network node, and the second collected data is based on the data collection policy and a second proximity metric indicating a second logical distance between the device and the network node, wherein the first collected data and the second collected are subsets of the captured data and the subsets of the captured data are determined based on an anomaly trigger type and the first proximity metric and the second proximity metric, and wherein the first collected data and the second collected data include different types of data, and wherein the processor is configured to transfer, to the analysis server, a first amount of first collected data when the device and the network node are separated by the first logical distance, and transfer from the device, to the analysis server, a second amount of first collected data that is less than the first amount of collected data when the device and the network node are separated by the second logical distance that is greater than the first logical distance.

10. The device of claim 9, wherein the configuration information includes instructions regarding types of data to collect.

11. The device of claim 9, wherein the configuration information includes at least one of the anomaly trigger type, a proximity event to source indicator, a destination address of the analysis server, or a format of the collected data.

12. The device of claim 9, wherein the processor is further configured to detect the anomaly by detecting at least one of: whether the captured data is missing at least two consecutive periods, whether a mayday broadcast is received from the network node, a predetermined change in a control plane of a network in which the device and the network node are located is detected, a predetermined change in data packets reaching the device or the network node is detected, or a predetermined threshold has been met.

13. The device of claim 9, wherein the memory comprises non-volatile memory, and the processor is configured to store the first collected data in the non-volatile memory.

14. The device of claim 9, wherein the processor is further configured to load the device with a library of trigger definitions corresponding to potential anomalies.

15. The device of claim 9, wherein the processor is further configured to store the first captured data in a distributed manner across a plurality of network nodes other than the analysis server, the device and the network node.

16. One or more non-transitory computer readable storage media encoded with software comprising computer executable instructions and when the software is executed operable to:

receive configuration information sufficient to establish a data collection policy;

capture data in accordance with the data collection policy to obtain captured data;

detect an anomaly occurring at a network node of a network in which a device on which the software is executing is also located; and in response to detecting the anomaly, transfer, to an analysis server one of first collected data and second collected data derived from the captured data, wherein the first collected data is based on both the data collection policy and a first proximity metric indicating a first logical distance between the device and the network node, and the second collected data is based on the data collection policy and a second proximity metric indicating a second logical distance between the device and the network node, wherein the first collected data and the second collected are subsets of the captured data and the subsets of the captured data are determined based on an anomaly trigger type and the first proximity metric and the second proximity metric, and wherein the first collected data and the second collected data include different types of data, and wherein the instructions when the software is executed are operable to transfer, to the analysis server, a first amount of first collected data when the device and the network node are separated by the first logical distance, and transfer from the device, to the analysis server, a second amount of first collected data that is less than the first amount of collected data when the device and the network node are separated by the second logical distance that is greater than the first logical distance.

17. The non-transitory computer readable storage media of claim 16, further comprising instructions operable to detect the anomaly by detecting at least one of: whether the first captured data is missing at least two consecutive periods, whether a mayday broadcast is received from the network node, a predetermined change in a control plane of a network in which the device and the network node are located is detected, a predetermined change in data packets reaching the device or the network node is detected, or a predetermined threshold has been met.

* * * * *